US011392433B1

(12) United States Patent
Antinori et al.

(10) Patent No.: US 11,392,433 B1
(45) Date of Patent: Jul. 19, 2022

(54) GENERATION OF ASYNCHRONOUS APPLICATION PROGRAMMING INTERFACE SPECIFICATIONS FOR MESSAGING TOPICS

(71) Applicant: Red Hat, Inc., Raleigh, NC (US)

(72) Inventors: Paolo Antinori, Milan (IT); Eric Philip Wittmann, Hartford, CT (US)

(73) Assignee: RED HAT, INC., Raleigh, NC (US)

( * ) Notice: Subject to any disclaimer, the term of this patent is extended or adjusted under 35 U.S.C. 154(b) by 0 days.

(21) Appl. No.: 17/158,750

(22) Filed: Jan. 26, 2021

(51) Int. Cl.
*G06F 9/54* (2006.01)

(52) U.S. Cl.
CPC .............. *G06F 9/546* (2013.01); *G06F 9/541* (2013.01); *G06F 9/542* (2013.01)

(58) Field of Classification Search
CPC ......... H04L 67/02; H04L 67/40; G06F 9/541; G06F 8/73
See application file for complete search history.

(56) References Cited

U.S. PATENT DOCUMENTS

| | | | | |
|---|---|---|---|---|
| 8,140,630 | B2 | 3/2012 | Jones et al. | |
| 2017/0012838 | A1* | 1/2017 | Kashtan | H04L 67/02 |
| 2020/0351332 | A1* | 11/2020 | Palladino | H04L 67/10 |
| 2021/0064453 | A1* | 3/2021 | Bahrami | G06N 3/0445 |
| 2021/0176324 | A1* | 6/2021 | Shetty | H04L 51/16 |
| 2021/0279115 | A1* | 9/2021 | Aspro | G06F 8/10 |

OTHER PUBLICATIONS

Author unknown; solace—Discovery Runtime Audit; 2020; 1 page; Magento.
Author unknown; springwolf / springwolf-core—Automated documentation for async APIs built with Spring Boot; 2020; 3 pages; GitHub, Inc.
Author unknown; Topics in Asynchronous API; 2020; 3 pages; Magento.
Bush; How to Write Your First AsyncAPI Specification (https://nordicapis.com/how-towrite-your-first-asyncapi-specification/); Jul. 15, 2020; 10 pages; Retrieved on Oct. 28, 2020.
Gomez et al.; A model-based approach for developing event-driven architectures with AsyncAPI; Oct. 18, 2020; 11 pages.

* cited by examiner

*Primary Examiner* — Brian W Wathen
(74) *Attorney, Agent, or Firm* — K&L Gates LLP

(57) ABSTRACT

Systems and methods for generating asynchronous application programming interface (API) documents are generally described. In various examples, a metadata discovery request may be sent to a message broker. A list of topics may be received from the message broker. First metadata related to a first topic of the list of topics may be received from the message broker. A first message may be received from the message broker, where the first message pertains to the first topic. A first schema may be determined using the first message pertaining to the first topic. The first schema may include data describing content of the first message and organization of the content of the first message. An asynchronous API document may be generated based at least in part on the first schema and the first metadata.

20 Claims, 7 Drawing Sheets

GENERATION OF ASYNCHRONOUS APPLICATION PROGRAMMING INTERFACE SPECIFICATIONS FOR MESSAGING TOPICS

BACKGROUND

The present disclosure generally relates to asynchronous application programming interface (API) specifications. Representational State Transfer (REST) APIs use the synchronous paradigm of communication, where a request is made and a response is waited for before making a new request. For example, in the context of the Internet, a uniform resource locator (URL) is entered into a browser interface, which sends a request to the server. The server sends the response with the content of the website. Accordingly, the web is an example implementation of a REST API. REST API calls are often referred to as "synchronous" API calls indicating that code execution and user interaction is stopped until the call returns the requested information. In some other scenarios other operations may be asynchronous, as code execution and/or user interaction need not stop to wait for the response. Event-driven architectures (EDAs) employ asynchronous communication. In EDAs, data (usually referred to as messages) are sent by a "publisher" (an entity generating the data) to a message broker. The message broker may be infrastructure that stores the message and delivers the message to "subscribers" (applications that have registered to receive the particular message from the particular publisher).

SUMMARY

The present disclosure provides a new and innovative system, methods and apparatus for generation of asynchronous API specifications for messaging topics. In an example, a metadata discovery request may be sent to a message broker. A list of topics of the message broker may be received. First metadata related to a first topic of the list of topics may be received from the message broker. A first message may be received from the message broker. In some examples, the first message may pertain to the first topic. A first schema may be determined using the first message pertaining to the first topic. In various examples, the first schema may include data describing content of the first message and organization of the content of the first message. An asynchronous application programming interface (API) document may be generated based at least in part on the first schema and the first metadata.

In another example, a system may comprise a message broker and a first computing device. The first computing device may comprise non-transitory computer-readable memory configured in communication with at least one processor. The non-transitory computer-readable memory may store instructions that, when executed by the at least one processor, are configured to receive, from the message broker, topic data related to a first topic. In various further examples, the instructions, when executed by the at least one processor may be further configured to receive a first message from the message broker, the first message pertaining to the first topic. In some other examples, the instructions, when executed by the at least one processor may be further configured to determine a first schema using the first message pertaining to the first topic. In some examples, the first schema may include data describing content of the first message and organization of the content of the first message. In some other examples, the instructions, when executed by the at least one processor may be further configured to generate an asynchronous application programming interface (API) document based at least in part on the first schema.

In yet another example, a method of requesting and receiving an asynchronous API document describing an event-driven API may comprise sending, by a first computing device to a second computing device, a request to generate an asynchronous application programming interface document comprising a machine-readable definition of an event-driven API. In various examples, the first computing device may send, to the second computing device, data indicating a message broker used by the event-driven API. In some other examples, the first computing device may receive, from the second computing device, the asynchronous API document comprising the machine-readable definition of the event-driven API.

Additional features and advantages of the disclosed method and apparatus are described in, and will be apparent from, the following Detailed Description and the Figures.

DETAILED DESCRIPTION OF EXAMPLE EMBODIMENTS

Figure 1:
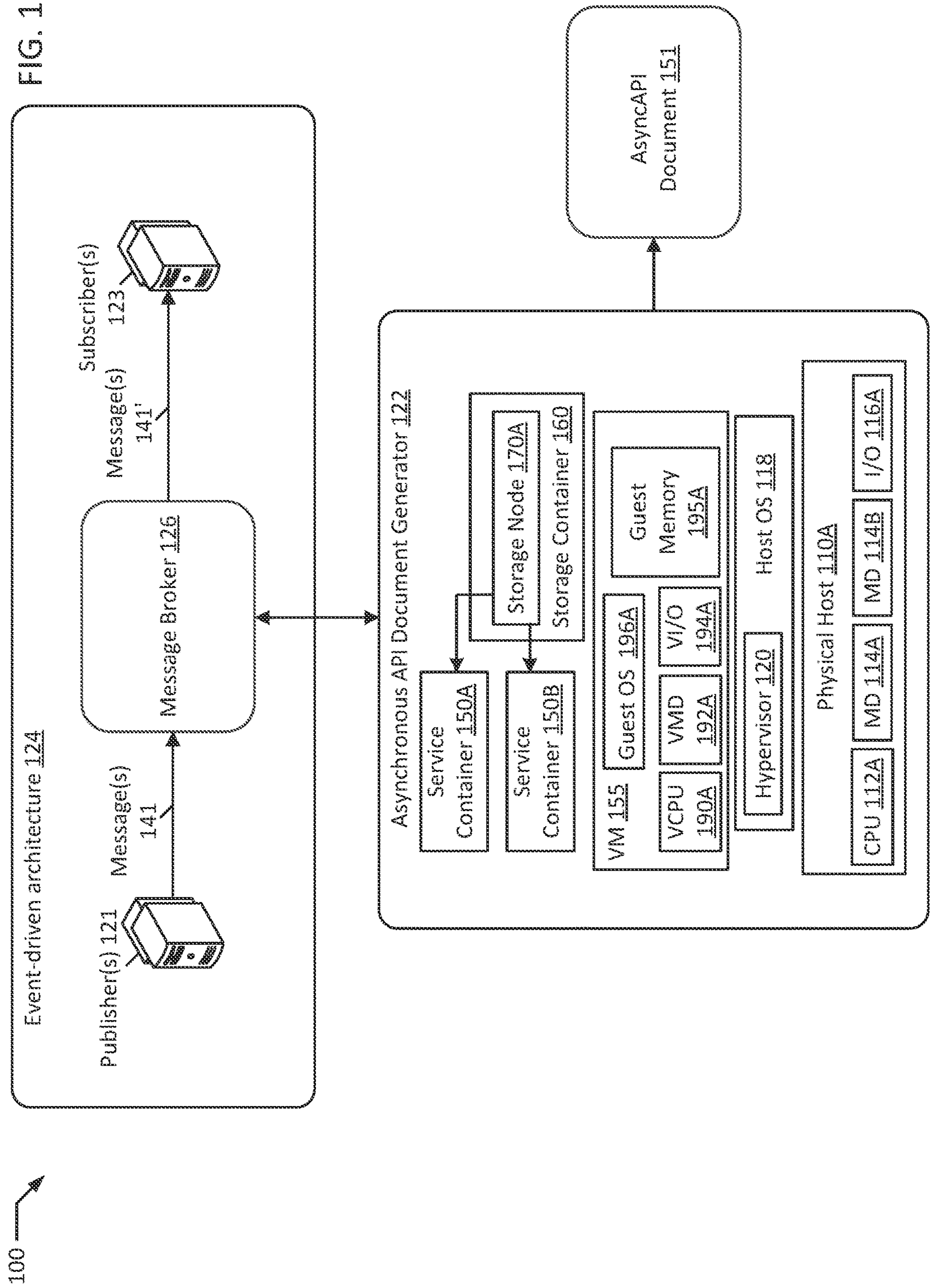
FIG. 1 is a block diagram of an asynchronous API document generator configured in communication with an event-driven architecture, according to various examples of the present disclosure.

Event-driven architectures (EDAs) employ asynchronous communication. In EDAs, entities generating data are referred to as "publishers," while the recipients/consumers of such data are referred to as "subscribers." Communication in EDAs is referred to as asynchronous because a publisher need not wait for a response from any subscribers prior to generating/publishing additional data. By contrast, in a synchronous messaging architecture such as those provided by REST APIs, a sender waits for a response from a recipient prior to sending additional data.

EDAs typically employ infrastructure called a "message broker" that receives messages (data) from publishers and delivers the messages to subscribers that have registered to receive such messages. Examples of message brokers include RabbitMQ, Apache Kafka, JBoss Messaging, Solace, etc. Accordingly, publishers may be data generating software/hardware that sends messages to the message broker. For example, a publisher may be a smart thermostat that sends temperature data to a message broker, a social media network that sends new subscriber data to a message broker, a smart refrigerator that sends data regarding food stored in the refrigerator to a message broker, etc. Publishers may be any type of application and/or embedded systems that generate and send data using an EDA. Subscribers may be applications that connect to the message broker, manifest an interest in a certain type of message (e.g., messages assigned to a particular "topic"), and maintains the connection with the message broker so that the message broker is able to push the messages to the subscriber.

Messages are data that are sent by publishers to the message broker, and which are pushed to the relevant subscribers. The content of messages can be any data. Such messages are often described as events or commands. Events communicate a fact (e.g., a temperature detected by the thermostat), while commands provide executable instructions to cause the subscriber application to take a particular action.

Message brokers support communication through a number of different channels, referred to herein as "topics." A topic may include a name, a version number, metadata describing the topic, etc. Publishers send messages that are organized into particular topics. Subscribers are able to subscribe to topics of interest in order to receive messages that are of interest to the subscriber while excluding messages of other topics which may not be of interest to the subscriber. Accordingly, subscribers may subscribe to a particular topic with the message broker. Additionally, publishers may publish message data that is organized into a topic. Upon receipt of such message data, the message broker may determine the topic, may determine the subscribers that are subscribed to the topic, and may send the message data to those subscribers.

In EDAs, messages may be sent from publishers using a variety of different protocols. Examples of such protocols may include, but are not limited to, message queuing telemetry transport (MQTT), constrained application protocol (CoAP), advanced message queuing protocol (AMQP), hypertext transfer protocol (HTTP), etc. Accordingly, asynchronous application programming interfaces (APIs) (e.g., AsyncAPI) may be similar to synchronous APIs (e.g., OpenAPI), but may include different content/organization. For example, asynchronous APIs may include metadata indicating the protocol being used, metadata indicating one or more topic names, server data, schema data (describing a content and/or organization of the message data), etc.

Asynchronous API documents (sometimes referred to as asynchronous API specifications) are files that define and annotate the different components of a specific EDA. Asynchronous API documents (e.g., AsyncAPI documents) are text files formatted in JSON or YAML. Asynchronous API documents are machine-readable definitions of event-driven APIs that can be programmatically used to generate documentation and code, validate messages received by a subscriber application, and/or apply API management policies to messages prior to arriving at a message broker. Accordingly, asynchronous API documents provide interoperability for systems and interfaces involved in an EDA. Asynchronous API documents can describe topics (e.g., Apache Kafka topics) as an asynchronous API.

Writing asynchronous API documents is generally a manual task. Generation of the asynchronous API documents can be a tedious and time-intensive operation. Additionally, such documents may become outdated over time as changes are made to the underlying services. Described herein are various systems and techniques that can programmatically generate asynchronous API documents (e.g., AsyncAPI documents) by connecting to the EDA system and automatically discovering metadata and schemas related to the target event-driven service. The discovered metadata and schema data may then be used to programmatically populate an asynchronous API document template in order to generate an asynchronous API document in an automated way for the target event-driven service.

The asynchronous API document generator (e.g., the systems and techniques described herein that programmatically generate asynchronous API documents) may be effective to connect to a message broker (or to multiple message brokers) of the target EDA. The asynchronous API document generator may receive a list of topic names from the message broker(s). The asynchronous API document generator may send a metadata discovery request to the message broker(s) for each of the topics in the list of topics. The metadata discovery request may provide such metadata as version numbers, server information, security configuration information, message names, etc. Further, the asynchronous API document generator may sample messages from each topic of the list of topics. The asynchronous API document generator may determine payload-specific metadata and may determine schema data from the messages. In various examples, schema data (describing the content and organization of the message) may be internal to the messages. In various other examples, the schema data may be external to the messages and a reference may be provided in the messages (e.g., a uniform resource locator (URL)) for accessing the external schema data. If an internal or external schema is determined from the sampled messages, the asynchronous API document generator may use the metadata and schema data described above to populate a template for asynchronous API documents that is specific to the list of topics. If no schema (either internal or external) is provided in the message, the asynchronous API document generator may include logic effective to parse the data of the message and/or the provided metadata in order to populate a template for asynchronous API documents. The asynchronous API document (e.g., an AsyncAPI document) may be provided to the user for any desired modifications of the asynchronous API document.

FIG. 1 is a block diagram of a system 100 comprising an asynchronous API document generator 122 configured in communication with an event-driven architecture 124, according to various examples of the present disclosure. The asynchronous API document generator 122 may be implemented using software, hardware, and/or some combination thereof. In the example asynchronous API document generator 122 depicted in FIG. 1, the asynchronous API document generator 122 may include one or more physical host(s), including physical host 110A. Physical host 110A may in turn include one or more physical processor(s) (e.g., CPU 112A) communicatively coupled to one or more memory device(s) (e.g., MDs 114A-B) and one or more input/output device(s) (e.g., I/O 116A). As used herein, physical processor or processors 112A refer to devices capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions and/or threads. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit ("CPU").

As discussed herein, memory devices 114A-B refer to volatile or non-volatile memory devices, such as RAM, ROM, EEPROM, or any other device capable of storing data. In an example, memory devices 114A may be persistent storage devices such as hard drive disks ("HDD"), solid state drives ("SSD"), and/or persistent memory (e.g., Non-Volatile Dual In-line Memory Module ("NVDIMM")). Memory devices 114A-B may additionally include replication of data to prevent against data loss due to a failure in any one device. This replication may be implemented through, for example, a redundant array of independent disks ("RAID") setup. RAID arrays may be designed to increase performance, to provide live data backup, or a combination of both. As discussed herein, I/O device(s) 116A refer to devices capable of providing an interface between one or more processor pins and an external device, the operation of which is based on the processor inputting and/or outputting binary data. CPU(s) 112A may be interconnected using a variety of techniques, ranging from a point-to-point processor interconnect, to a system area network, such as an Ethernet-based network. Local connections within physical hosts 110A, including the connections between processors 112A and memory devices 114A-B and between processors 112A and I/O device 116A may be provided by one or more local buses of suitable architecture, for example, peripheral component interconnect (PCI).

In an example, physical host 110A may run one or more isolated guests, for example, VM 155, which may in turn host additional virtual environments (e.g., VMs and/or containers). In an example, a container (e.g., storage container 160, service containers 150A-B) may be an isolated guest using any form of operating system level virtualization, for example, Red Hat® OpenShift®, Docker® containers, chroot, Linux®-VServer, FreeBSD® Jails, HP-UX® Containers (SRP), VMware ThinApp®, etc. Storage container 160 and/or service containers 150A-B may run directly on a host operating system (e.g., host OS 118) or run within another layer of virtualization, for example, in a virtual machine (e.g., VM 155). In an example, containers that perform a unified function may be grouped together in a container cluster that may be deployed together (e.g., in a Kubernetes® pod). In an example, a given service may require the deployment of multiple VMs, containers and/or pods in multiple physical locations. In an example, VM 155 may be a VM executing on physical host 110A.

Asynchronous API document generator 122 may run one or more VMs (e.g., VMs 122), by executing a software layer (e.g., hypervisor 120) above the hardware and below the VM 155, as schematically shown in FIG. 1. In an example, the hypervisor 120 may be a component of respective host operating system 118 executed on physical host 110A, for example, implemented as a kernel based virtual machine function of host operating system 118. In another example, the hypervisor 120 may be provided by an application running on host operating system 118A. In an example, hypervisor 120 may run directly on physical host 110A without an operating system beneath hypervisor 120. Hypervisor 120 may virtualize the physical layer, including processors, memory, and I/O devices, and present this virtualization to VM 155 as devices, including virtual central processing unit ("VCPU") 190A, virtual memory devices ("VIVID") 192A, virtual input/output ("VI/O") device 194A, and/or guest memory 195A. In an example, another virtual guest (e.g., a VM or container) may execute directly on host OSs 118 without an intervening layer of virtualization.

In an example, a VM 155 may be a virtual machine and may execute a guest operating system 196A which may utilize the underlying VCPU 190A, VMD 192A, and VI/O 194A. Processor virtualization may be implemented by the hypervisor 120 scheduling time slots on physical CPUs 112A such that from the guest operating system's perspective those time slots are scheduled on a virtual processor 190A. VM 155 may run on any type of dependent, independent, compatible, and/or incompatible applications on the underlying hardware and host operating system 118. The hypervisor 120 may manage memory for the host operating system 118 as well as memory allocated to the VM 155 and guest operating system 196A such as guest memory 195A provided to guest OS 196A. In an example, storage container 160 and/or service containers 150A, 150B are similarly implemented.

In an example, in addition to distributed storage provided by storage container 160, storage controller 142 may additionally manage storage in dedicated storage nodes (e.g., NAS, SAN, etc.). In an example, storage controller 142 may deploy storage in large logical units with preconfigured performance characteristics (e.g., storage nodes 170A). In an example, access to a given storage node (e.g., storage node 170A) may be controlled on an account and/or tenant level. In an example, a service container (e.g., service containers 150A-B) may require persistent storage for application data, and may request persistent storage with a persistent storage claim to orchestrator 140. In the example, storage controller 142 may allocate storage to service containers 150A-B through a storage node (e.g., storage nodes 170A) in the form of a persistent storage volume. In an example, a persistent storage volume for service containers 150A-B may be allocated a portion of the storage capacity and throughput capacity of a given storage node (e.g., storage nodes 170A). In various examples, the storage container 160 and/or service containers 150A-B may deploy compute resources (e.g., storage, cache, etc.) that are part of a compute service that is distributed across multiple clusters (not shown in FIG. 1).

The various virtualized computing systems (e.g., service containers 150A, 150B, VM 155) may be examples of computing environments that may deploy one or more of the techniques described herein for programmatic generation of an asynchronous API document for event-driven architecture 124. For example, service container 150A may request and/or receive a list of topics handled by message broker 126. Service container 150B may sample messages from each topic of the list of topics and/or may determine schema data for the different topics. VM 155 may receive the metadata from service container 150A and the schema data from service container 150B and may populate an asynchronous API document template using the metadata and the schema data to generate AsyncAPI document 151. The foregoing example is merely one possible implementation of an asynchronous API document generator 122. The actual deployment of the various services and/or systems of the asynchronous API document generator 122 are implementation-specific details and may be modified as desired in accordance with the present disclosure. The asynchronous API document generator 122 may be deployed across any number of physical computing devices and/or virtualized computing environments, depending on the desired implementation.

Event-driven architecture 124 may be an EDA that may be described by AsyncAPI document 151. AsyncAPI document 151 may be a machine-readable JSON/YAML text document that may comprise a machine-readable definition of the event-driven API. Accordingly, the AsyncAPI document 151 may be used to automatically generate and/or format code for interfacing with the event-driven architecture 124. Event-driven architecture 124 may comprise one or more publisher(s) 121. Publisher(s) 121 may generate message(s) 141 that may be sent to message broker 126. Although only a single message broker 126 is depicted in FIG. 1, multiple message brokers may be used in a given EDA. The techniques for asynchronous API document generation are equally applicable to an EDA having multiple message brokers. Message broker 126 (e.g., Apache Kafka) may receive the message(s) 141 and may determine the topics to which the message(s) 141 pertain. For each message 141, message broker 126 may determine the set of sub scriber(s) 123 that have subscribed to the topic of the particular message and may send the message 141' to the appropriate subscribers 123. As shown in FIG. 1, asynchronous API document generator 122 may communicate with message broker 126 to determine the relevant information (e.g., topic names, version numbers, security parameters, server information, protocol information, schema data, etc.) that is used to generate AsyncAPI document 151, as described in further detail below.

As an example, the asynchronous API document generator 122 may request a list of topics handled by the message broker 126. In another example, the asynchronous API document generator 122 may request metadata related to a specified topic from message broker 126. In examples where the asynchronous API document generator 122 receives a list of topics, the asynchronous API document generator 122 may perform an iterative metadata discovery operation to determine metadata related to each topic of interest among the list of topics. Accordingly, the asynchronous API document generator 122 may send a metadata discovery request to the message broker 126 for each topic of interest. Metadata may include names of the topics, version numbers, security parameters, server information, message names, protocol information, etc.

Additionally, the asynchronous API document generator 122 may sample messages from the various topics in order to determine schema data of the messages (e.g., data indicating the content and/or organization of the messages). Below is an example of a topic with a message called "lightMeasured":

```
39  topics:
40    smartylighting/streetlights/1/0/event/{streetlightId}/lighting/
      measured:
41      description: The topic on which measured values may be
        produced and consumed.
42      parameters:
43        streetlightId:
44            $ref: '#/components/parameters/streetlightId'
45      subscribe:
46        summary: Receive information about environmental
        lighting conditions of a particular streetlight.
47        operationId: receiveLightMeasurement
48        traits:
49          - $ref: #/components/operationTraits/kafka'
```

-continued

```
50          message:
51            $ref: #/components/messages/lightMeasured'
```

For the topic described on line 40, a particular schema may describe the format of data for the messages "lightMeasured." $ref on line 51 is a reference to a different line of the text describing an internal schema of lightMeasured messages. An example of such a schema may be:

```
87  messages:
88    lightMeasured:
89          name: lightMeasured
90          title: Light measured
91          summary: Inform about environmental lighting conditions
        for a particular streetlight.
92          contentType: application/j son
93          traits:
94          - $ref: Wcomponents/messageTraits/commonHeaders'
95          payload:
96          $ref: "#/components/schemas/lightMeasuredPayload"
The asynchronous API document generator 122 includes logic to parse
such schema
```

data included in messages to populate the relevant fields of the AsyncAPI document template for a message named "lightMeasured." The example schema above, in turn, includes references on lines 94 and 96 to different information about the message schema for "lightMeasured" messages. For example, a pointer to the payload schema for such messages in included in line 96. An example of the payload schema may be internal to the message or may be provided at an external location that is pointed to by the $ref at line 96. An example of such a payload schema may be:

```
114  schemas:
115    lightMeasuredPayload:
116      type: object
117      properties:
118        lumens:
119            type: integer
120            minimum: 0
121            description: Light intensity measured in lumens.
122          sentAt:
123            $ref: "#/components/schemas/sentAt"
```

Accordingly, asynchronous API document generator 122 may parse messages sampled from message broker 126 for each topic of interest in order to determine schema data describing the content and/or organization of the sampled messages. In some examples, the schema data may be included within the messages themselves. Such schema data may be referred to as internal schema data. In some other examples, the schema data may be referenced in the messages, but may not be present within the message payloads. For example, a message may include a pointer and/or URL to a different location at which the schema data is accessible. Such schema data may be referred to as external schema data. In some further examples, the logic of the asynchronous API document generator 122 may be configured to determine the schema data based on the organization of the content of the sampled message, even where no internal or external schema data is provided explicitly.

The schema data may be used to populate the AsyncAPI document 151 defining the format of messages for the event-driven architecture 124. Additionally, metadata discovered from the message broker 126 related to one or more topics of interest may be used to populate other fields of the AsyncAPI template in order to generate AsyncAPI document 151 (or any other asynchronous API document). For example, topic names, message names, description data, server data, security data, protocol data, etc., may be provided by message broker 126 to asynchronous API document generator 122 in response to a metadata discovery request. As previously described, such requests may be sent for each topic of interest.

Figure 2:
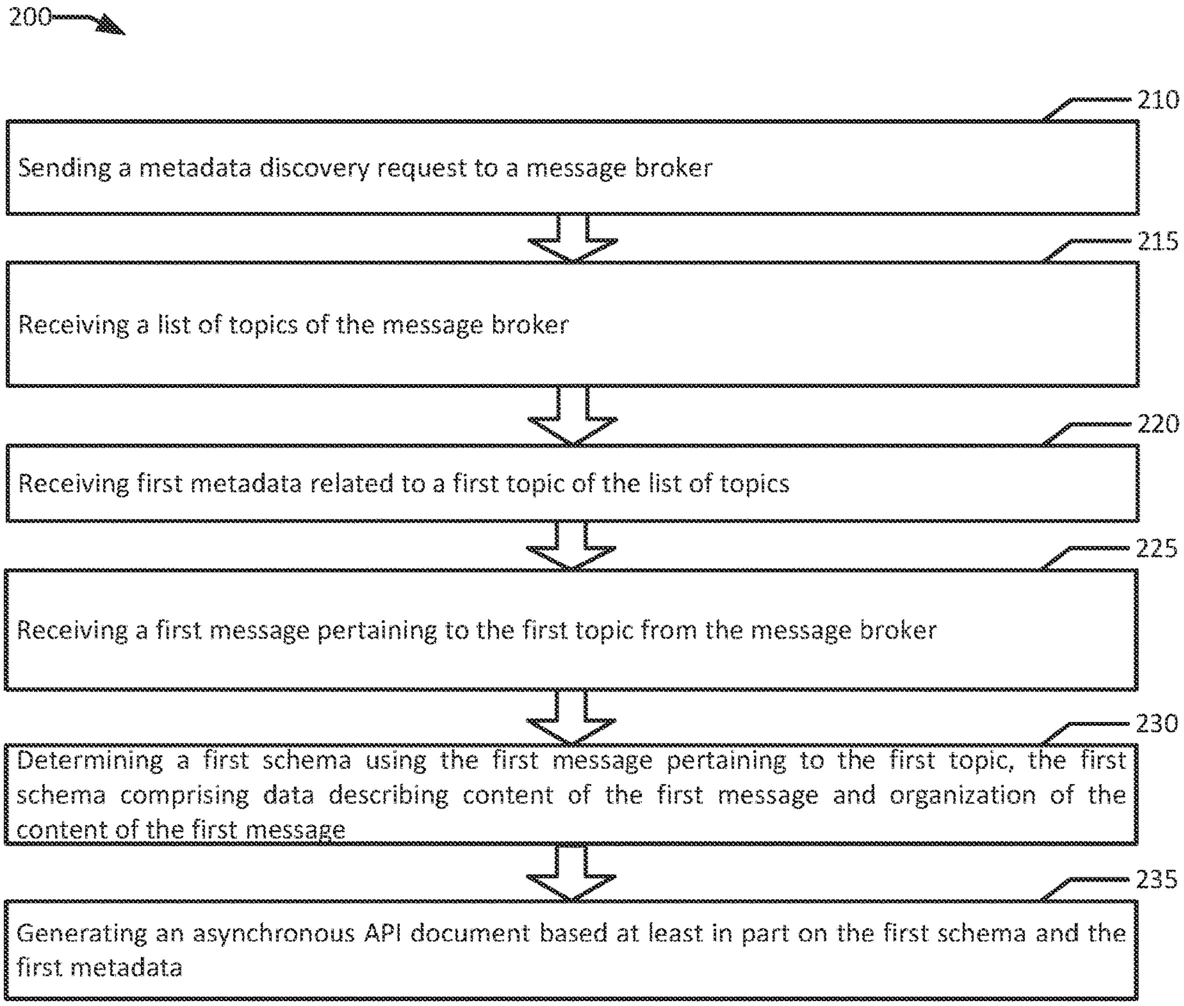
FIG. 2 is flowchart illustrating an example process for generating an asynchronous API document, according to an example of the present disclosure.

FIG. 2 is flowchart illustrating an example process 200 for generating an asynchronous API document, according to an example of the present disclosure. Although the example process 200 is described with reference to the flowchart illustrated in FIG. 2, it will be appreciated that many other methods of performing the acts associated with the process 200 may be used. For example, the order of some of the blocks may be changed, certain blocks may be combined with other blocks, blocks may be repeated, and some of the blocks described may be optional. The process 200 may be performed by processing logic that may comprise hardware (circuitry, dedicated logic, etc.), software, or a combination of both. In some examples, the actions described in the blocks of the process 200 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices.

The example process 200 includes sending a metadata discovery request to a message broker (block 210). In various examples, asynchronous API document generator 122 may send a metadata discovery request to message broker 126. In the example of FIG. 2, the metadata discovery request may request information concerning topics registered with message broker 126. For example, the metadata discovery request may request information about all topics handled by message broker 126 or a subset of topics handled by message broker 126.

In an example, the process 200 may include receiving a list of topics of the message broker (block 215). In various examples, the message broker 126 may return a list of names of topics in response to the metadata discovery request. In some examples, after receiving the list of names of the topics, the asynchronous API document generator 122 may send metadata discovery requests for metadata related to each topic of interest. For example, the asynchronous API document generator 122 may iteratively send a metadata discovery request for available metadata specific to each topic of interest among the list of topics received.

In an example, the process 200 may include receiving first metadata related to a first topic of the list of topics (block 220). In some examples, the first metadata may include metadata describing the data that is exchanged over that topic. For example, security configuration parameters, server information, protocol information, version numbers, etc., may be returned describing the first topic. The asynchronous API document generator 122 may incorporate such metadata into the AsyncAPI document 151 describing the event-driven architecture 124.

In an example, the process 200 may include receiving a first message pertaining to the first topic from the message broker (block 225). For example, the asynchronous API document generator 122 may subscribe to the first topic and may sample messages generated for the first topic and received from the message broker 126. As described in further detail below, logic of the asynchronous API document generator 122 may be configured to determine various payload data and/or metadata included in the sampled messages and may include such data in the asynchronous API document describing the event-driven architecture 124.

In an example, the process 200 may include determining a first schema using the first message pertaining to the first topic, where the first schema may include data describing content of the first message and organization of the first message (block 230). For example, a message may include internal schema data that describes formatting of the messages. Accordingly, the internal schema data may be used by asynchronous API document generator 122 to populate an asynchronous API document template for the first message of the first topic. Such a procedure may be followed for each topic of interest and/or for each message of each topic in order to programmatically generate an asynchronous API document. The internal schema may describe the formatting of the message (e.g., the schema may describe the different fields and their location within the payload of the message) and/or may describe the content of the message (e.g., the schema may describe what kind of data is represented in each field of the payload of the message. Additionally, the schema may similarly describe the content and organization of the message header. Further, although an internal schema is described herein, the first schema may instead be an external schema that is referenced by data within the first message. The external schema may be stored at a different location (rather than within the payload of the first message). Accordingly, the asynchronous API document generator 122 may access the location referenced by the first message data in order to determine the schema for the first message. In still other examples, logic of the asynchronous API document generator 122 may be used to parse the first message in order to determine the schema (e.g., based on a comparison of the first message to one or more known schemas).

In an example, the process 200 may include generating an asynchronous API document based at least in part on the first schema and the first metadata (block 235). As described herein, the asynchronous API document generator 122 may include one or more asynchronous API document templates that may be populated based on the metadata and/or schemas determined for each topic of interest. Accordingly, the asynchronous API document generator 122 may programmatically populate the fields of the template for each topic and/or each message discovered during the process 200 in order to build a machine-readable asynchronous API document (such as Async API document 151). As previously described, users may then modify, customize, and/or update the asynchronous API document and use the document to automatically interface the event-driven architecture 124 with other systems and/or generate code for the event-driven architecture 124.

Figure 3:
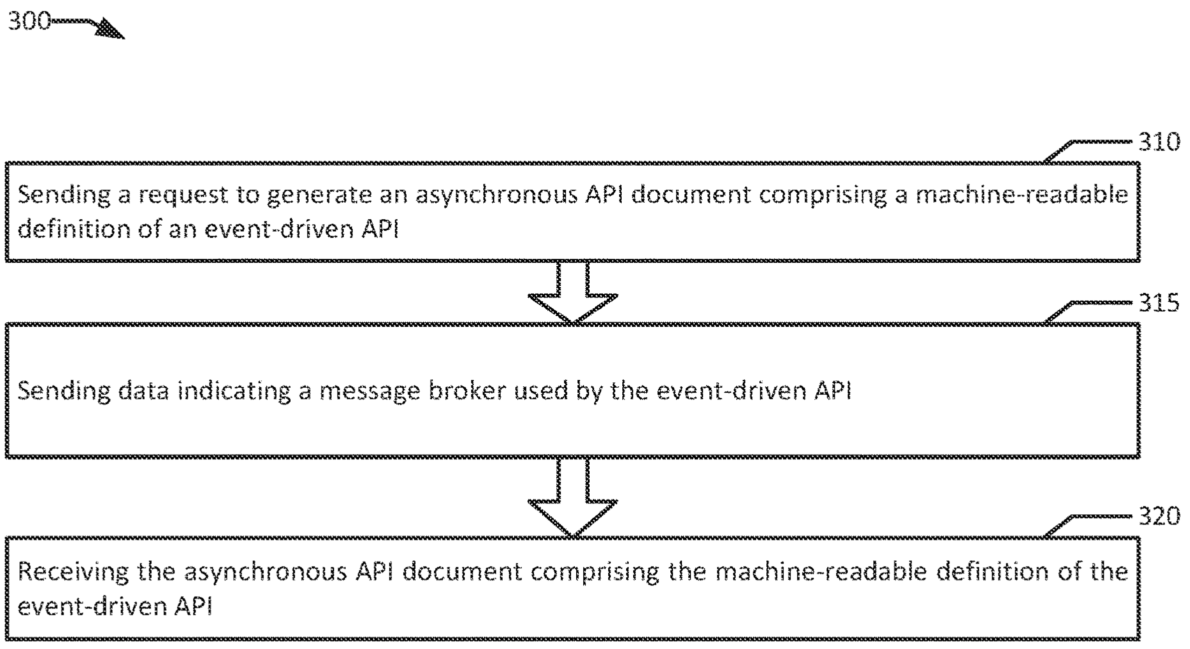
FIG. 3 is flowchart illustrating an example process for requesting and receiving an asynchronous API document from an asynchronous API document generator according to an example of the present disclosure.

FIG. 3 is flowchart illustrating an example process 300 for requesting and receiving an asynchronous API document from an asynchronous API document generator according to an example of the present disclosure. In various examples, the process 300 may be initiated by a developer (or other user) of an event-driven architecture (e.g., event-driven architecture 124) in order to generate an asynchronous API document comprising a machine-readable description of an asynchronous API. Accordingly, a developer or other user may use the process 300 to generate an asynchronous API document for an event-driven API.

In some examples, process 300 may include sending a request to generate an asynchronous API document comprising a machine-readable definition of an event-driven API (block 310). For example, a developer or user may send a request to generate an asynchronous API document for a given event-driven API (specified in the request) that uses a particular message broker (e.g., Apache Kafka or similar). The request may be sent to asynchronous API document generator 122.

In some examples, process 300 may include sending data indicating a message broker used by the event-driven API (block 315). For example, the developer (or other user) may send data (e.g., via a user interface of asynchronous API document generator 122) to indicate the particular message broker being used by the event-driven API for which the asynchronous API document is to be generated. In some examples, the data may include an IP address of the message broker and/or other data distinguishing the message broker from other message brokers.

In some examples, process 300 may include receiving the asynchronous API document comprising the machine-readable definition of the event-driven API (block 320). After populating an asynchronous API document template to generate an asynchronous API document and/or after receiving any user modifications of the asynchronous API document the asynchronous API document comprising the machine-readable definition of the event-driven API may be received and/or published by the user/developer. Thereafter, the asynchronous API document may be used to generate code and/or programmatically interface different systems with the event-driven API.

Figure 4:
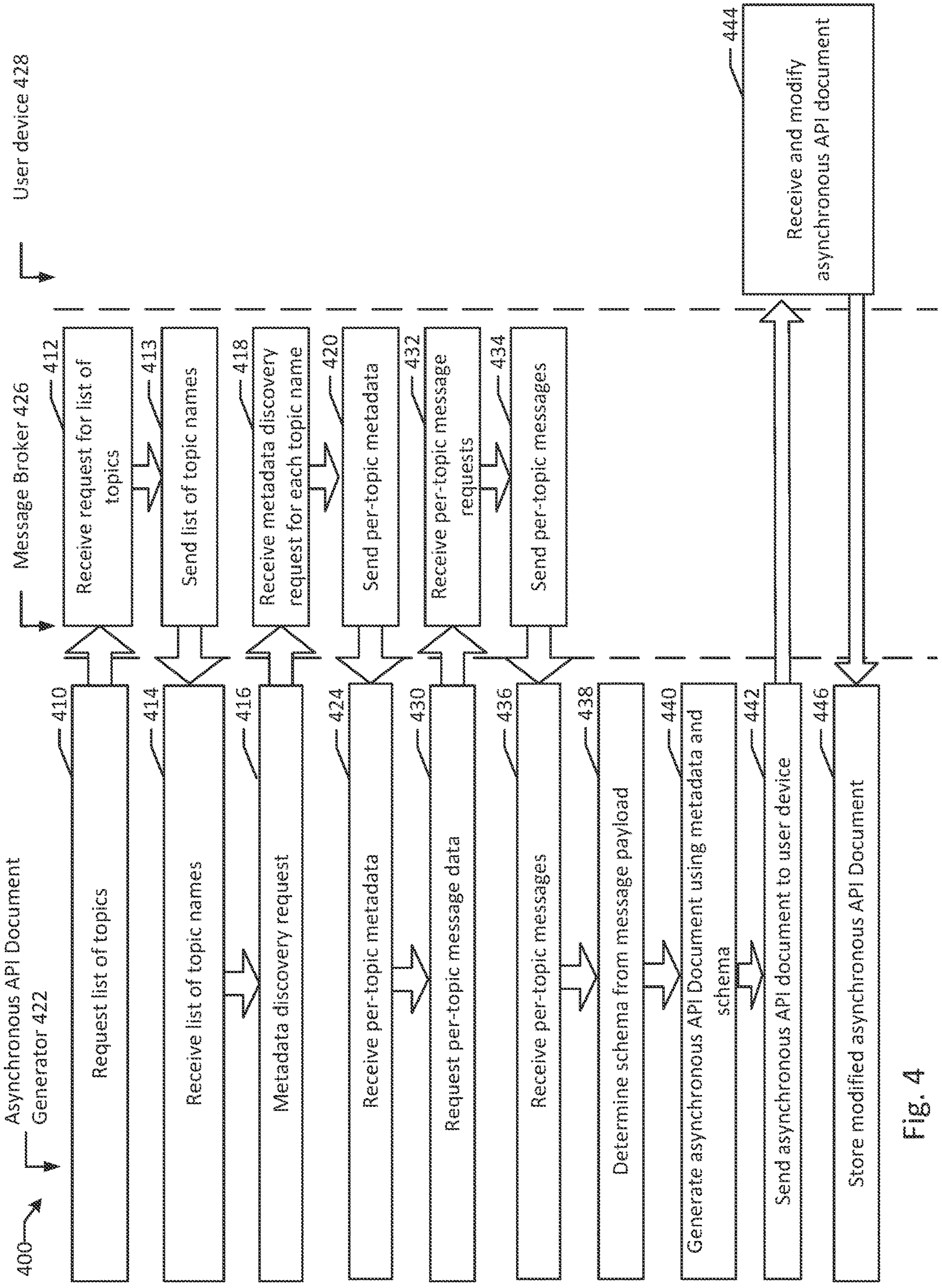
FIG. 4 illustrates a flow diagram of an example generation of an asynchronous API document for an event-driven architecture according to various aspects of the present disclosure.

FIG. 4 illustrates a flow diagram of an example generation of an asynchronous API document for an event-driven architecture according to various aspects of the present disclosure. Although the examples below are described with reference to the flow diagram illustrated in FIG. 4, many other methods of performing the acts associated with FIG. 4 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In illustrated example 400, an asynchronous API document generator 422 may request a list of topics pertaining to message broker 426 (block 410). The message broker 426 may receive the request for the list of topics (block 412). In various examples, the request for the list of topics may specify one or more publishers configured in communication with the message broker 426, and/or may otherwise specify a subset of the various topics handled by message broker 426. In other examples, the asynchronous API document generator 422 may request a list of all topics handled by the particular message broker 426.

In response, message broker 426 may send a list of topic names (block 413). The list of topic names may correspond to the requested list of topics in the request sent by asynchronous API document generator 422. For example, if the asynchronous API document generator 422 requested a subset of all topics (e.g., topics related to one or more specified publishers), the list of topic names may include only those topic names related to the specified publishers. In other examples, the list of topic names may include all topic names of a particular event-driven API and/or all topic names handled by the particular message broker 426.

The asynchronous API document generator 422 may receive the list of topic names (block 414) sent by the message broker 426 in response to the request. For each topic name of the list of topic names, asynchronous API document generator 422 may send a metadata discovery request to message broker 426 (block 416). Accordingly, the metadata discovery request may be topic-specific.

Message broker 426 may receive the metadata discovery request for each topic name (block 418). Message broker 426 may provide the requested metadata. Examples of such metadata may include version numbers, communication protocols, server information, security configuration data, etc. Message broker 426 may send the per-topic metadata to asynchronous API document generator 422 (block 420). Asynchronous API document generator 422 may receive the per-topic metadata (block 424). As described in further detail below, asynchronous API document generator 422 may incorporate the metadata into the relevant fields of an asynchronous API document template.

Asynchronous API document generator 422 may request per-topic message data for each topic in the list of topic names received (block 430). In some examples, the asynchronous API document generator 422 may subscribe to each topic using an interface of the message broker 426 and may sample messages from the topic in order to populate the relevant fields of the asynchronous API document template. The message broker 426 may receive the per-topic message requests (block 432) and may send the per-topic messages (block 434) to asynchronous API document generator 422.

Asynchronous API document generator 422 may receive the per-topic messages (block 436) and may use the messages to determine a schema from the message payload (block 438). For example, asynchronous API document generator 422 may receive a first message (or a first number of messages) pertaining to a first topic and may determine an internal schema within the payload of the message or an external schema referenced within the payload of the message. In some further examples, the asynchronous API document generator 422 may include logic that may parse the message payload to determine a schema of the message (e.g., according to known message schemas stored in memory).

Asynchronous API document generator 422 may generate an asynchronous API document using the metadata and schema data received for the topic-specific messages and the topic (block 440). For example, per-topic metadata, such as server information and protocol information may be used to populate the relevant fields of the asynchronous API document template. For example, metadata indicating that the protocol used by the topic is MQTT may be used to populate a protocol field of the asynchronous API document template. Further, the schema data determined for messages of the topic may be used to organize and populate the relevant message fields for the topic. An example message schema in an asynchronous API document has been shown and described previously herein.

Asynchronous API document generator 422 may send the asynchronous API document to a user device (block 442). In various examples, the user device may be the device that requested generation of the asynchronous API document. The user device 428 may receive and/or modify the asynchronous API document (block 444). For example, the asynchronous API document may be modified by the user (e.g., using a user interface of user device 428) in order to customize the asynchronous API document according to user preferences and/or system requirements. The modified asynchronous API document may be sent back to the asynchronous API document generator 422. The asynchronous API document generator 422 may store the modified asynchronous API document in memory (block 446). In various examples, the user may publish the modified asynchronous API document (e.g., on an intranet of an enterprise system or on the Internet) so that other developers may use the modified asynchronous API document.

Figure 5:
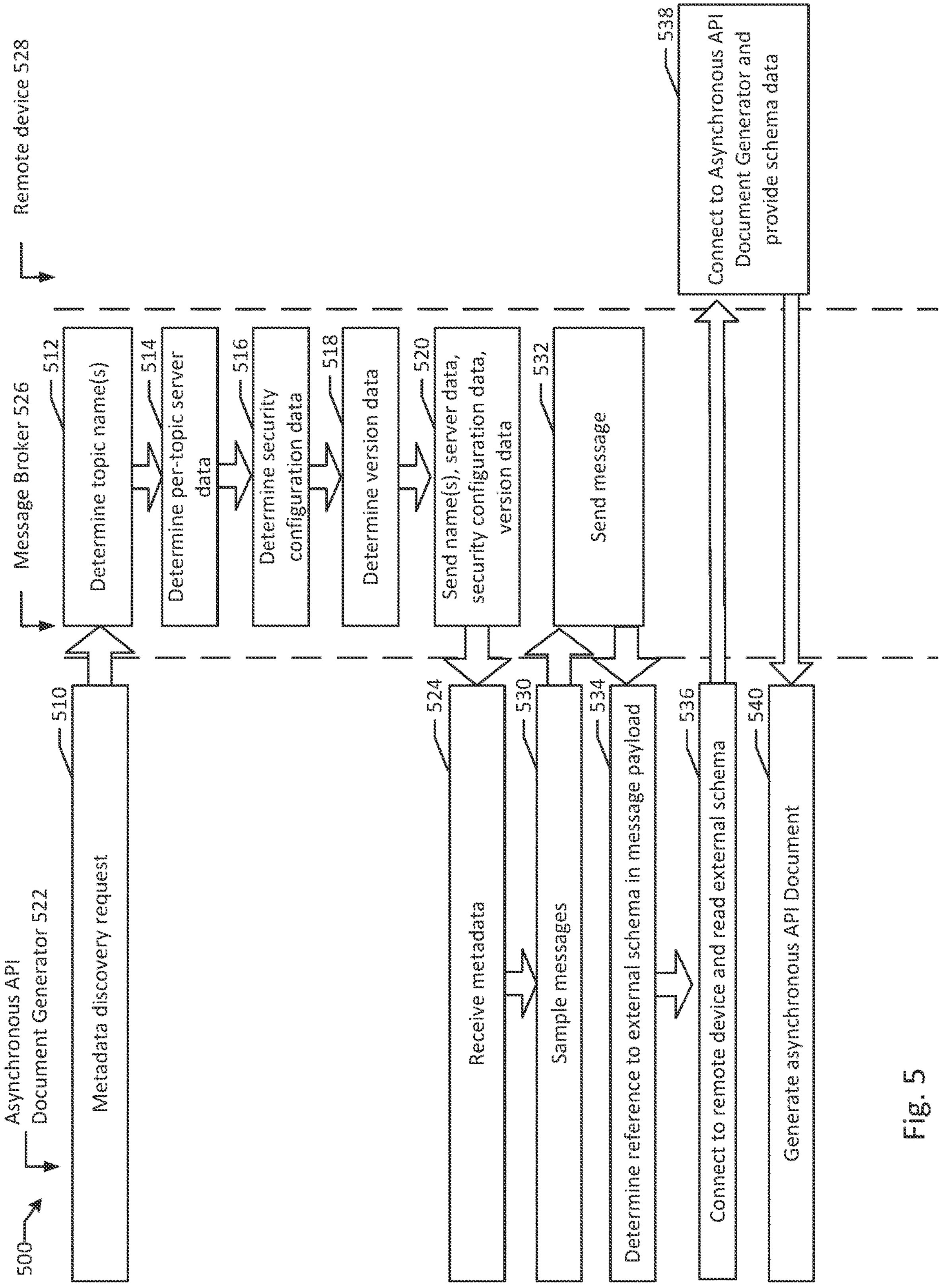
FIG. 5 illustrates a flow diagram of an example metadata and schema discovery process for generation of an asynchronous API document according to various aspects of the present disclosure.

FIG. 5 illustrates a flow diagram of an example metadata and schema discovery process for generation of an asynchronous API document according to various aspects of the present disclosure. Although the examples below are described with reference to the flow diagram illustrated in FIG. 5, many other methods of performing the acts associated with FIG. 5 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both.

In the illustrated example 500, an asynchronous API document generator 522 may send a metadata discovery request to message broker 526 (block 510). In various examples, the metadata discovery request may be topic-specific or may be a general metadata discovery request for all, or a set of topics, handled by the message broker 526. The metadata discovery request may specify particular types of metadata to be returned. The particular metadata requested may depend on the implementation and/or on the implementation of the message broker 526.

The message broker 526 may determine one or more topic names (block 512) in response to the metadata discovery request. For example, the topic names may be the names of topics that are handled by the message broker 526 and/or a subset of those topics. In some examples, the list of topic names may be returned to the asynchronous API document generator 522. In such cases, the asynchronous API document generator 522 may then send topic-specific metadata requests for various information (such as server information, security configuration data, version data, etc.).

The message broker 526 may determine per-topic server data (block 514). The server data may comprise server URL data and/or port data, protocol data (for communication protocols supported by the server), default connection types, etc. The message broker 526 may determine security configuration data (block 516). The security configuration data may comprise public key data, supported authorization process flows, etc. The message broker 526 may determine version data (block 518). The version data may be a version of the event-driven API for which the asynchronous API document is being generated.

The message broker 526 may send the topic name(s), server data, security configuration data, and/or version data to the asynchronous API document generator 522 (block 520). The asynchronous API document generator 522 may receive this metadata (block 524), and use such metadata to populate fields of an asynchronous API document template. For example, the server data may be used to populate relevant server fields of the asynchronous API document template, security data may be used to populate relevant security fields of the asynchronous API document template, etc. Example populated server fields and security fields of an asynchronous API document template are depicted below, for illustrative purposes. The actual fields and/or values are dependent on the desired implementation, the particular event-driven API, and/or the specific asynchronous API document template being used.

```
servers:
production:
  url: api.streetlights.smartylighting.com:{port}
```

-continued

```
    protocol: mqtt
    description: Test broker
    variables:
      port:
        description: Secure connection (TLS) is available through
        port 8883.
          default: '1883'
          enum:
            - '1883'
            - '8883'
    security:
      - apiKey: [ ]
      - supportedOauthFlows:
        - streetlights:on
        - streetlights:off
        - streetlights:dim
      - openIdConnectWellKnown: [ ]
```

The asynchronous API document generator 522 may sample messages from the topics of the message broker 526 for which the metadata has been received (block 530). In various examples, the asynchronous API document generator 522 may subscribe to the topics and may sample messages from the topics in order to determine the various messages pertaining to each topic and to determine schema data describing the content and organization of those messages. The message broker 526 may send messages to the asynchronous API document generator 522 (block 532). The messages may be sampled for each topic of interest (e.g., for each topic of the list of topic names provided by the message broker during metadata discovery). The asynchronous API document generator 522 may receive a message and may determine that no internal schema data describing the content and organization of the message is present in the payload of the message. In an example, the asynchronous API document generator 522 may determine that a reference to an external schema is present in the message payload (block 534). The reference to the external schema may point to a storage location on a remote device 528. The asynchronous API document generator 522 may connect to the remote device 528 and may read the external schema (block 536). The remote device may provide the external schema data to the asynchronous API document generator 522 over the connection (block 538). The asynchronous API document generator 522 may use the external schema data to populate the template for the asynchronous API document. The external schema may define the content and organization for the particular message. An example of a message schema is provided above, for illustrative purposes.

In some examples, different messages of a particular topic may be aggregated together based on a common pattern between the messages. In an example, an event-driven API may be used to send data related to traffic signals within a city. Each traffic signal in the city may have a different traffic signal ID used to distinguish that traffic signal from other traffic signals. A particular topic of data published by the various traffic signals may be related to lighting conditions experienced by the different traffic signals. Each traffic signal ID may publish its own lighting conditions using a separate message; however, these different messages may have a common format differing only by the traffic signal ID and the payload data sent by that particular traffic signal. The asynchronous API document generator 522 may determine the pattern that exists between such messages. The topics of such messages may be combined using logic of the asynchronous API document generator 522. For example, the topic smartylighting/streetlights/I/O/event/{streetlightId}/ lighting/measured may represent a plurality of topics for each different street light ID. However, the topics may be combined in the asynchronous API document to generally describe all such related topics based on the similar pattern in the messages of the different, but related topics (e.g., differing only by the {streetlightId} parameter).

Figure 6:
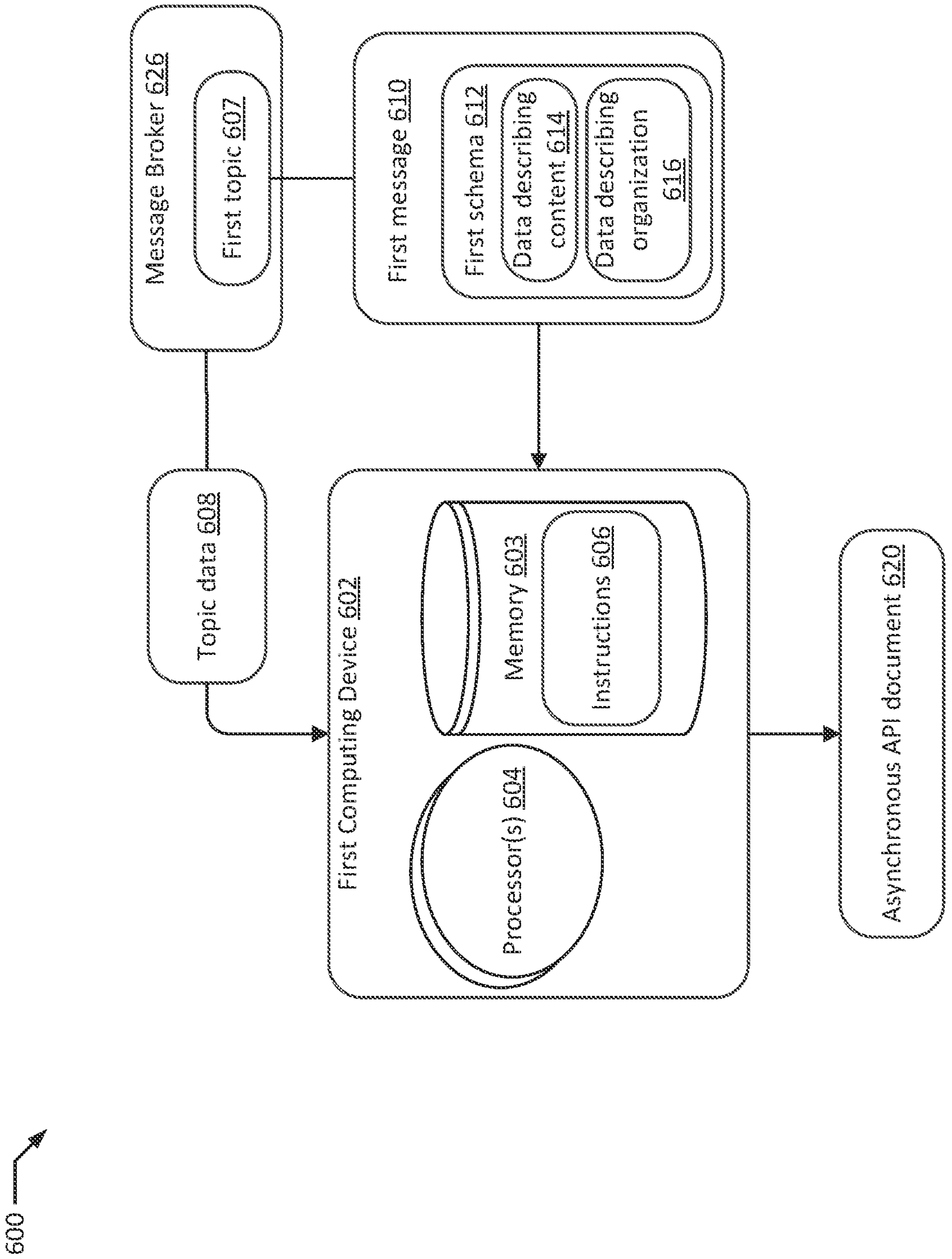
FIG. 6 is block diagram of a computing device in communication with a message broker according to an example of the present disclosure.

FIG. 6 is block diagram of a system 600 comprising a first computing device 602 in communication with a message broker 626, according to an example of the present disclosure. First computing device 602 may comprise at least one processor 604 and non-transitory computer-readable memory 603. The memory 603 may store instructions 606. The instructions 606 may be executed by the processor to perform various techniques described herein related to generation of the asynchronous API document 620.

The first computing device 602 may be configured in communication with a message broker 626. The message broker 626 may have one or more registered topics including first topic 607. The first topic 607 may be a topic of an event-driven architecture for which message broker 626 receives message data published by one or more publishers. The message broker 626 may send the message data to one or more subscribers subscribed to the first topic 607. The first computing device 602 may receive topic data 608 from message broker 626. The topic data 608 may be, for example, metadata describing the first topic 607. The metadata may include server data, security configuration data, protocol data, etc.

Message broker 626 may send a first message 610 of the first topic 607 to first computing device 602. In various examples, first computing device 602 may subscribe to the first topic 607 in order to receive the first message 610 of the first topic 607. The first message 610 may comprise or otherwise be associated with a first schema 612. The first schema 612 may include data describing content 614 of the first message 610 and/or data describing an organization 616 of the first message 610. First computing device 602 may receive the first message 610 and the topic data 608 and may generate asynchronous API document 620 based at least in part on the first schema 612.

Figure 7:
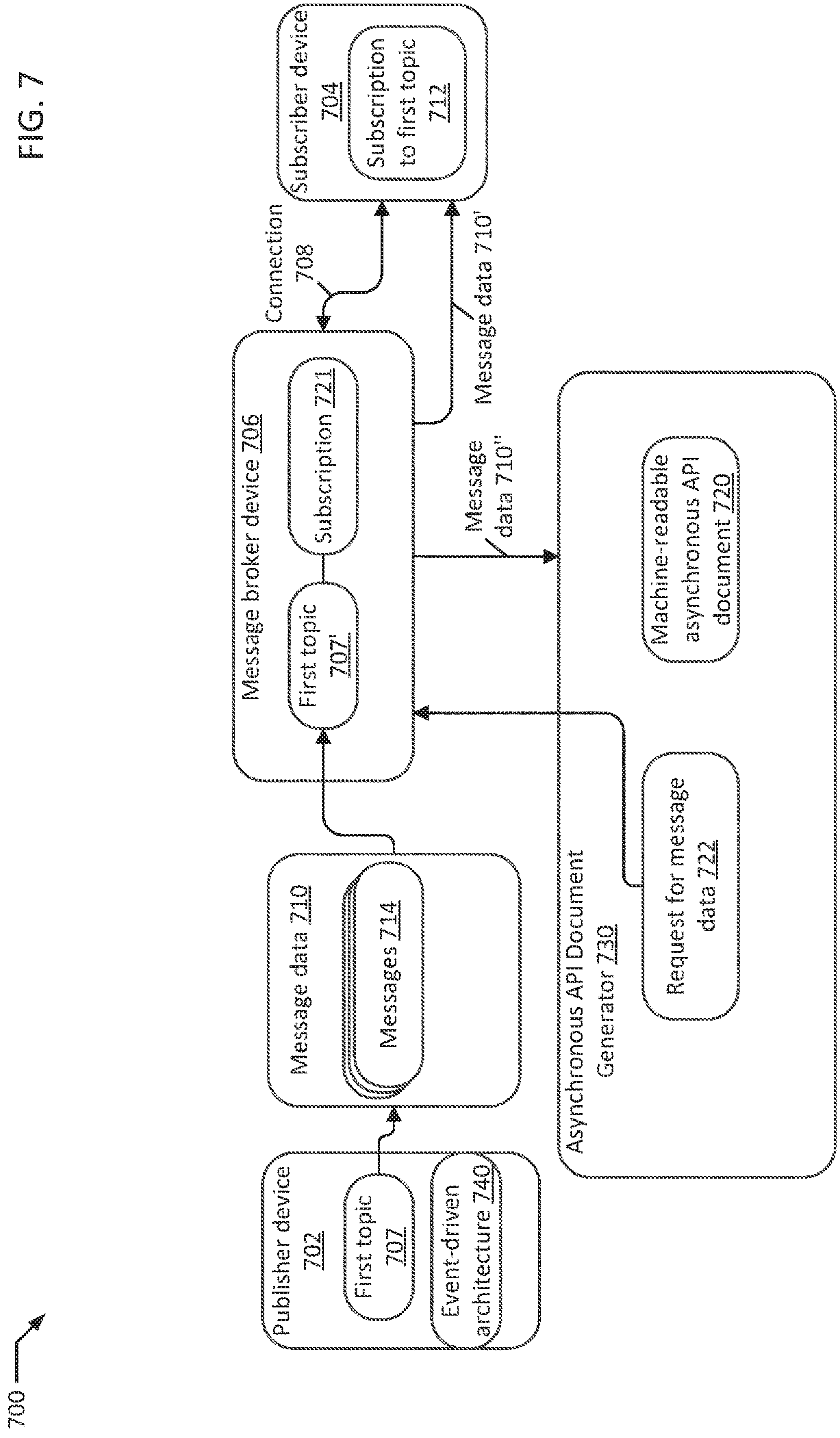
FIG. 7 is block diagram of an event driven architecture in communication with an asynchronous API document generator according to an example of the present disclosure.

FIG. 7 is block diagram of a system 700 comprising an event driven architecture 740 in communication with an asynchronous API document generator 730, according to an example of the present disclosure. A publisher device 702 may communicate with a message broker device 706 in an event-driven architecture 740. Publisher device 702 may generate message data 710 of a first topic 707. Message data 710 may comprise a plurality of messages 714 of the first topic 707. The message broker device 706 may receive the message data 710 and may determine that the message data 710 is of the first topic 707'. Message broker device 706 may determine subscribers that have subscribed to the first topic 707' via a subscription 721.

Message broker device 706 may establish a connection 708 with subscriber device 704. In the example, subscriber device 704 may have a subscription to the first topic 712. Accordingly, message data 710' of the first topic 707' may be sent from message broker device 706 to subscriber device 704. In various examples, an asynchronous API document generator 730 may communicate with message broker device 706. The asynchronous API document generator 730 may receive instructions to generate machine-readable asynchronous API document 720 describing event-driven architecture 740. Accordingly, asynchronous API document generator 730 may send a request for message data 722 to the message broker device 706. The request for message data 722 may be related to one or more topics handled by the message broker device 706 that pertain to the event-driven architecture 740. The message broker device 706 may send the message data 710" to the asynchronous API document generator 730. The message data 710" may comprise one or more messages pertaining to the first topic 707'. In various examples, the asynchronous API document generator 730 may comprise logic effective to parse the message data 710" to determine schema data describing the content and/or organization of the message data 710". The schema data may be used to populate an asynchronous API document template in order to generate the machine-readable asynchronous API document 720 (e.g., an AsyncAPI document).

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

Aspects of the subject matter described herein may be useful alone or in combination with one or more other aspects described herein. In a 1st example aspect of the present disclosure, a method comprises sending a metadata discovery request to a message broker. A list of topics of the message broker may be received from the message broker. First metadata related to a first topic of the list of topics may be received from the message broker. A first message pertaining to the first topic may be received from the message broker. A first schema may be determined using the first message pertaining to the first topic. In some examples, the first schema may include data describing content of the first message and organization of the content of the first message. In some examples, an asynchronous API document may be generated based at least in part on the first schema and the first metadata.

In accordance with a 2nd example aspect of the present disclosure, which may be used in combination with any one or more of other aspects described herein (e.g., the 1st aspect), wherein the message broker is a message broker of an event-driven architecture.

In accordance with a 3rd example aspect of the present disclosure, which may be used in combination with any one or more of other aspects described herein (e.g., the 1st aspect), wherein the asynchronous API document defines and annotates components of a first event-driven API.

In accordance with a 4th example aspect of the present disclosure, which may be used in combination with any one or more of other aspects described herein (e.g., the 1st aspect), the method further comprising determining, for each topic of the list of topics, respective metadata, and sampling at least one message from each topic of the list of topics.

In accordance with a 5th example aspect of the present disclosure, which may be used in combination with any one or more of other aspects described herein (e.g., the 1st aspect), wherein the metadata comprises a version number of an API described by the asynchronous API document.

In accordance with a 6th example aspect of the present disclosure, which may be used in combination with any one or more of other aspects described herein (e.g., the 5th aspect), wherein the metadata comprises security configuration parameters for the API.

In accordance with a 7th example aspect of the present disclosure, which may be used in combination with any one or more of other aspects described herein (e.g., the 1st aspect), storing the asynchronous API document in non-transitory computer-readable memory, receiving, from a first computing device, a request to modify the asynchronous API document, generating a modified asynchronous API document according to modifications received from the first computing device, and storing the modified asynchronous API document in the non-transitory computer-readable memory.

In accordance with an 8th example aspect of the present disclosure, which may be used in combination with any one or more of other aspects described herein (e.g., the 1st aspect), receiving, from the message broker, second metadata related to a second topic of the list of topics, receiving a second message from the message broker, the second message pertaining to the second topic, determining a pattern in data of the first message and data of the second message, and combining the first topic and the second topic in the asynchronous API document according to the pattern.

In accordance with a 9th example aspect of the present disclosure, which may be used in combination with any one or more of other aspects described herein (e.g., the 1st aspect), parsing the first message to identify the first schema included in the first message.

In accordance with a 10th example aspect of the present disclosure, which may be used in combination with any one or more of other aspects described herein (e.g., the 1st aspect), parsing the first message to identify a reference to an external schema stored at a remote location; and retrieving the first schema from the remote location using the reference.

In accordance with a 11th example aspect of the present disclosure, which may be used in combination with any one or more of other aspects described herein (e.g., the 1st aspect), extracting, from the first message, first server data comprising a uniform resource locator (URL) of the message broker and a message protocol used by the message broker; and populating a server section of the asynchronous API document with the URL and the message protocol.

In accordance with a 12th example aspect of the present disclosure, which may be used in combination with any one or more of other aspects described herein (e.g., the 1st aspect), wherein the asynchronous API document comprises a machine-readable definition of an event-driven API.

Aspects of the subject matter described herein may be useful alone or in combination with one or more other aspects described herein. In a 13th example aspect of the present disclosure, a system comprises a message broker; and a first computing device comprising: at least one processor; and non-transitory computer-readable memory. The non-transitory computer-readable memory storing instructions that, when executed by the at least one processor are configured to: receive, from the message broker, topic data related to a first topic; receive a first message from the message broker, the first message pertaining to the first topic; determine a first schema using the first message pertaining to the first topic, the first schema comprising data describing content of the first message and organization of the content of the first message; and generate an asynchronous application programming interface (API) document based at least in part on the first schema.

In accordance with a 14th example aspect of the present disclosure, which may be used in combination with any one or more of other aspects described herein (e.g., the 13th aspect), further comprising a second computing device configured to: receive the asynchronous API document from the first computing device; generate a modified asynchronous API document by modifying the first schema of the asynchronous API document; and send the modified asynchronous API document to the first computing device.

In a 15th example aspect of the present disclosure, which may be used in combination with any one or more of other aspects described herein (e.g., the 13th aspect), wherein the message broker is a message broker of an event-driven architecture.

In a 16th example aspect of the present disclosure, which may be used in combination with any one or more of other aspects described herein (e.g., the 13th aspect), wherein the asynchronous API document defines and annotates components of a first event-driven API.

In a 17th example aspect of the present disclosure, which may be used in combination with any one or more of other aspects described herein (e.g., the 13th aspect), wherein the non-transitory computer-readable memory stores further instructions that, when executed by the at least one processor, are further effective to: receive, from the message broker, a list of topics pertaining to the message broker; determine, for each topic of the list of topics, respective metadata; and sample at least one message from each topic of the list of topics.

In a 18th example aspect of the present disclosure, which may be used in combination with any one or more of other aspects described herein (e.g., the 13th aspect), wherein the non-transitory computer-readable memory stores further instructions that, when executed by the at least one processor, are further effective to: receive, from the message broker, second metadata related to a second topic of the list of topics; receive a second message from the message broker, the second message pertaining to the second topic; determine a pattern in data of the first message and data of the second message; and combine the first topic and the second topic in the asynchronous API document according to the pattern.

In accordance with a 19th example aspect of the present disclosure, which may be used in combination with any one or more of other aspects described herein (e.g., the 18th aspect), wherein the non-transitory computer-readable memory stores further instructions that, when executed by the at least one processor, are further effective to parse the first message to identify the first schema included in the first message.

In accordance with a 20th example aspect of the present disclosure, which may be used in combination with any one or more of other aspects described herein (e.g., the 13th aspect), wherein the non-transitory computer-readable memory stores further instructions that, when executed by the at least one processor, are further effective to: parse the first message to identify a reference to external schema at a remote location; and retrieve the first schema from the remote location using the reference.

In accordance with a 21st example aspect of the present disclosure, which may be used in combination with any one or more of other aspects described herein (e.g., the 13th aspect), wherein the non-transitory computer-readable memory stores further instructions that, when executed by the at least one processor, are further effective to: query the message broker for metadata related to the first topic; and receive, from the message broker, metadata comprising at least one of a version number, security configuration parameters, and a name of the first topic.

Aspects of the subject matter described herein may be useful alone or in combination with one or more other aspects described herein. In a 22nd example aspect of the present disclosure, a method comprising: sending, by a first computing device to a second computing device, a request to generate an asynchronous application programming interface (AsyncAPI) document comprising a machine-readable definition of an event-driven API; sending, from the first computing device to the second computing device, data indicating a message broker used by the event-driven API; and receiving, from the second computing device, the asynchronous API document comprising the machine-readable definition of the event-driven API.

In accordance with a 23rd example aspect of the present disclosure, which may be used in combination with any one or more of other aspects described herein (e.g., the 22nd aspect), wherein the second computing device is configured to request, from the message broker, metadata related to topics of the message broker that pertain to the event-driven API.

In accordance with a 24th example aspect of the present disclosure, which may be used in combination with any one or more of other aspects described herein (e.g., the 22nd aspect), wherein the second computing device is configured to: receive a first message from the message broker, the first message pertaining to the first topic; and determine a first schema using the first message from the first topic, wherein the asynchronous API document includes first message data organized according to the first schema.

In accordance with a 25th example aspect of the present disclosure, which may be used in combination with any one or more of other aspects described herein (e.g., the 24th aspect), wherein the second computing device is configured to parse the first message to identify the first schema included in the first message.

In accordance with a 26th example aspect of the present disclosure, which may be used in combination with any one or more of other aspects described herein (e.g., the 24th aspect), wherein the second computing device is configured to: parse the first message to identify a reference to an external schema at a remote location; and retrieve the first schema from the remote location using the reference.

In accordance with a 27th example aspect of the present disclosure, which may be used in combination with any one or more of other aspects described herein (e.g., the 24th aspect), modifying at least one of a first schema of the asynchronous API document or first data included in a first field of the asynchronous API document to generate a modified asynchronous API document; and storing the modified asynchronous API document in memory.

Aspects of the subject matter described herein may be useful alone or in combination with one or more other aspects described herein. In a 28th example aspect of the present disclosure, a system comprising: a means for sending a request for metadata to a message broker; a means for receiving a first message from the message broker, the first message pertaining to a first topic; a means for parsing the first message to determine content of the first message and an organization of the content of the first message; and a means for populating fields of an asynchronous API document using the content and the organization of the content, the asynchronous API document comprising a machine-readable definition of an event-drive API.

In accordance with a 29th example aspect of the present disclosure, which may be used in combination with any one or more of other aspects described herein (e.g., the 28th aspect), further comprising a means for modifying the asynchronous API document to provide used-customized asynchronous API document.

In accordance with a 30th example aspect of the present disclosure, which may be used in combination with any one or more of other aspects described herein (e.g., the 28th aspect), further comprising a means for determining reference data included in the first message, the reference data referencing a schema of the first message stored by a remote computing device.

Aspects of the subject matter described herein may be useful alone or in combination with one or more other aspects described herein. In a 31st example aspect of the present disclosure, a system comprising: a publisher device; a subscriber device; and a message broker device configured in communication with the publisher device and the subscriber device; wherein the subscriber device is configured to establish a connection with the message broker and subscribe to a first topic of message data generated by the publisher device; wherein the publisher device is configured to generate message data of the first topic, the message data comprising a plurality of messages; wherein the message broker device is configured to: receive the message data from the publisher device; determine the first topic of the message data; determine that the subscriber device is subscribed to the first topic; send the message data to the subscriber device; receive a request for the message data from an asynchronous application programming interface (API) document generator; and send the message data to the asynchronous API document generator, wherein the asynchronous API document generator is effective to generate a machine-readable asynchronous API document describing an event-driven architecture of the publisher device based at least in part on the message data.

In accordance with a 32nd example aspect of the present disclosure, which may be used in combination with any one or more of other aspects described herein (e.g., the 31st aspect), wherein the message broker device is further configured to: receive, from the asynchronous API document generator, a request for metadata related to the first topic of the message data; and send the metadata related to the first topic to the asynchronous API document generator, wherein the metadata comprises at least one of a version number of the event-driven architecture or a name of the event-driven architecture.

In accordance with a 33rd example aspect of the present disclosure, which may be used in combination with any one or more of other aspects described herein (e.g., the 31st aspect), wherein the asynchronous API document generator is further effective to determine an internal schema describing content and organization of the message data.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method comprising:

sending a metadata discovery request to a message broker;

receiving, from the message broker, a list of topics of the message broker;

receiving, from the message broker, first metadata related to a first topic of the list of topics;

receiving a first message from the message broker, the first message pertaining to the first topic;

determining a first schema using the first message pertaining to the first topic, the first schema comprising data describing content of the first message and organization of the content of the first message; and generating an asynchronous application programming interface (API) document based at least in part on the first schema and the first metadata.

2. The method of claim 1, wherein the message broker is a message broker of an event-driven architecture.

3. The method of claim 1, wherein the asynchronous API document defines and annotates components of a first event-driven API.

4. The method of claim 1, further comprising:

determining, for each topic of the list of topics, respective metadata; and sampling at least one message from each topic of the list of topics.

5. The method of claim 4, wherein the metadata comprises a version number of an API described by the asynchronous API document.

6. The method of claim 5, wherein the metadata comprises security configuration parameters for the API.

7. The method of claim 1, further comprising:

storing the asynchronous API document in non-transitory computer-readable memory;

receiving, from a first computing device, a request to modify the asynchronous API document;

generating a modified asynchronous API document according to modifications received from the first computing device; and storing the modified asynchronous API document in the non-transitory computer-readable memory.

8. The method of claim 1, further comprising:

receiving, from the message broker, second metadata related to a second topic of the list of topics;

receiving a second message from the message broker, the second message pertaining to the second topic;

determining a pattern in data of the first message and data of the second message; and combining the first topic and the second topic in the asynchronous API document according to the pattern.

9. The method of claim 1, further comprising parsing the first message to identify the first schema included in the first message.

10. The method of claim 1, further comprising:

parsing the first message to identify a reference to an external schema stored at a remote location; and retrieving the first schema from the remote location using the reference.

11. The method of claim 1, further comprising:

extracting, from the first message, first server data comprising a uniform resource locator (URL) of the message broker and a message protocol used by the message broker; and populating a server section of the asynchronous API document with the URL and the message protocol.

12. The method of claim 1, wherein the asynchronous API document comprises a machine-readable definition of an event-driven API.

13. A system comprising:

a message broker; and a first computing device comprising:

at least one processor; and non-transitory computer-readable memory storing instructions that, when executed by the at least one processor, are configured to:

receive, from the message broker, topic data related to a first topic;

receive a first message from the message broker, the first message pertaining to the first topic;

determine a first schema using the first message pertaining to the first topic, the first schema comprising data describing content of the first message and organization of the content of the first message; and generate an asynchronous application programming interface (API) document based at least in part on the first schema.

14. The system of claim 13, further comprising a second computing device configured to:

receive the asynchronous API document from the first computing device;

generate a modified asynchronous API document by modifying the first schema of the asynchronous API document; and send the modified asynchronous API document to the first computing device.

15. The system of claim 13, wherein the message broker is a message broker of an event-driven architecture.

16. The system of claim 13, wherein the non-transitory computer-readable memory stores further instructions that, when executed by the at least one processor, are further effective to:

receive, from the message broker, a list of topics pertaining to the message broker;

determine, for each topic of the list of topics, respective metadata; and sample at least one message from each topic of the list of topics.

17. The system of claim 13, wherein the non-transitory computer-readable memory stores further instructions that, when executed by the at least one processor, are further effective to:

receive, from the message broker, second metadata related to a second topic;

receive a second message from the message broker, the second message pertaining to the second topic;

determine a pattern in data of the first message and data of the second message; and combine the first topic and the second topic in the asynchronous API document according to the pattern.

18. The system of claim 13, wherein the non-transitory computer-readable memory stores further instructions that, when executed by the at least one processor, are further effective to:

parse the first message to identify a reference to external schema at a remote location; and retrieve the first schema from the remote location using the reference.

19. The system of claim 13, wherein the non-transitory computer-readable memory stores further instructions that, when executed by the at least one processor, are further effective to:

query the message broker for metadata related to the first topic; and receive, from the message broker, metadata comprising at least one of a version number, security configuration parameters, and a name of the first topic.

20. A method comprising:

sending, by a first computing device to a second computing device, a request to generate an asynchronous application programming interface document comprising a machine-readable definition of an event-driven API;

sending, from the first computing device to the second computing device, data indicating a message broker used by the event-driven API; and receiving, from the second computing device, the asynchronous API document comprising the machine-readable definition of the event-driven API.

* * * * *